United States Patent [19]
Valentyik

[11] 3,896,660
[45] July 29, 1975

[54] SEDIMENTATION DEVICE

[75] Inventor: Laszlo Valentyik, Houghton, Mich.

[73] Assignee: Michigan Technological University, Houghton, Mich.

[22] Filed: Dec. 26, 1973

[21] Appl. No.: 428,206

[52] U.S. Cl. .................................. 73/61.4; 73/438
[51] Int. Cl. ............................................ G01n 15/04
[58] Field of Search............ 73/61.4, 61 R, 53, 438, 73/32 R, 299 R

[56] References Cited
UNITED STATES PATENTS

| | | | |
|---|---|---|---|
| 2,379,158 | 6/1945 | Kalischer | 73/61.4 X |
| 2,451,604 | 10/1948 | Barnes | 73/32 R |
| 2,668,365 | 2/1954 | Hogin | 73/32 R X |
| 3,543,565 | 12/1970 | de Koning et al. | 73/61 R |
| 3,666,419 | 5/1972 | Cahour et al. | 73/53 X |

*Primary Examiner*—Jerry W. Myracle
*Assistant Examiner*—Joseph W. Roskos

[57] ABSTRACT

The device for measuring the settling rate of solids suspended in a liquid medium includes a settling tube which receives a quantity of the suspension and has at least one pressure sensing port located below the liquid level of the suspension. The hydrostatic pressure being exerted by the suspension, in the vicinity of the pressure sensing port as the solids settle, is sensed by a pressure transducer which is hydraulically connected to the pressure sensing port. The pressure transducer provides an output signal which is representative of the weight of the suspended solids and is operatively connected to a recorder which automatically provides a continuous record indicative of the weight of the suspended solids with respect to time during sedimentation.

In one embodiment, the settling tube is provided with a plurality of vertically spaced pressure sensing ports which are connected by separate conduits to a sensing tube located beside the settling tube. The sensing tube is filled with a sensing liquid which hydraulically connects the pressure transducer with the settling tube through each pressure sensing port. Each of the connecting conduits include a stop cock and the settling rate of the solids above the level of a preselected pressure sensing port can be measured by closing the stop cocks associated with all the other pressure sensing ports.

10 Claims, 3 Drawing Figures

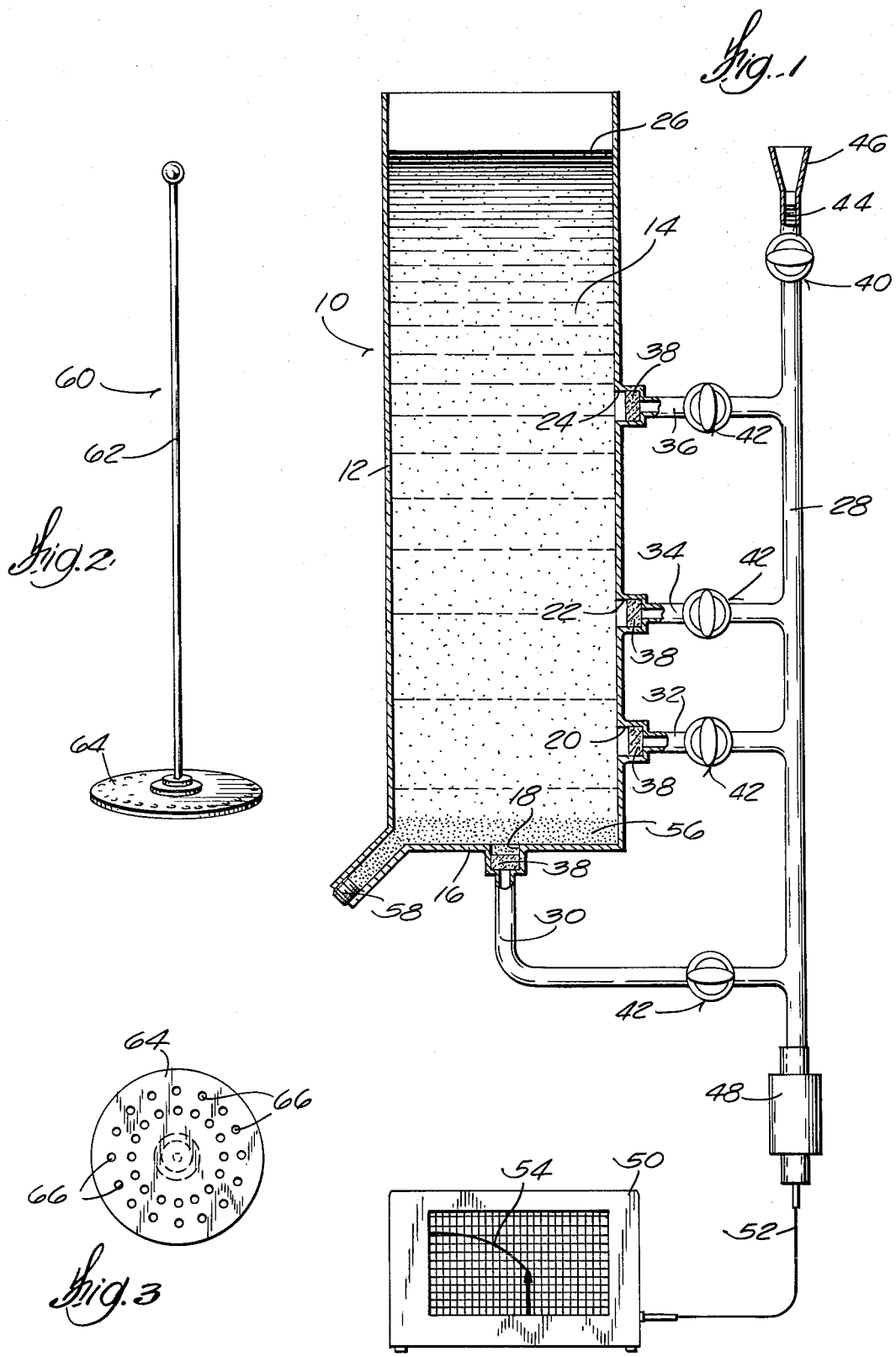

SEDIMENTATION DEVICE

BACKGROUND OF THE INVENTION

This invention relates to devices for analyzing sedimentation and, more particularly, to devices for measuring the settling rate of solids suspended in a liquid medium.

In industrial processes where sedimentation is involved in some form, it is desirable to have the capability for making accurate measurements of the rate at which solid particles settle in a liquid medium. For example, the mineral and aggregate industries commonly utilize a heavy media suspension (i.e. small particles of magnetite, ferrosilicone, clay, etc. suspended in water) for separating components of a feed material having specific gravities. In order to obtain optimum separation for a particular feed material, the consistency of the separation medium should be within predetermined limits or should be maintained within predetermined limits. The consistency of the separation medium is a direct function of the settling rate of small particles, generally referred to as the stability of the medium. If the stability medium is improper, the medium solids settle out and the separation medium will not be at the specific gravity required for the desired separation. That is, the lighter feed components do not float in a manner whereby the sinking heavier feed components can separate therefrom at an optimum rate.

Thus, an accurate measurement of the settling rate of the media solids is of prime importance. Also, in some processes, such as waste water treatment systems, a supernatant is withdrawn at different levels within the suspension, making it desirable to be able to measure the settling rate of the solids at various elevations within the suspension.

In one commonly used technique for determining the settling rate of suspended solids, a sample of the suspension is placed in a transparent sedimentation tube and, after vigorous mixing of the suspension, the elevation change of the interface between the supernatant and the settled solids is observed and manually recorded. This technique is very time consuming and is subject to considerable human error, especially when the suspension is relatively opaque.

As an alternative, various techniques and devices have been proposed for measuring a change in specific gravity or density of the suspension during sedimentation. Although somewhat less subject to erroneous readings, prior art techniques and devices usually still require an operator to take periodic readings and make manual recordings thereof. Furthermore, prior art techniques and devices have not been readily adaptable for making accurate measurements of the settling rate of the solids at various elevations in the suspension.

SUMMARY OF THE INVENTION

An object of this invention is to provide a relatively simple device which is capable of providing an accurate measurement of the settling rate of solids suspended in a liquid medium without the need for an operator to make periodic observations.

Another object of this invention is to provide such a device which is arranged to automatically produce an historical record of the settling characteristics of the solids from the time they are fully dispersed to the time they are completely settled.

A further object of this invention is to provide a device for measuring the settling rate of solids suspended in a liquid medium which is capable of measuring the settling rate for the solids at various elevations within the suspension.

Other objects, aspects and advantages of the invention will become apparent to those skilled in the art upon reviewing the following detailed description, the drawing and the appended claims.

According to the invention, a device is provided for automatically measuring the hydrostatic pressure being exerted by the suspension during sedimentation. More specifically, the device provided by the invention includes a settling tube for receiving a quantity of the suspension to be measured and having at least one pressure sensing port located below the liquid level of the suspension. A pressure sensing means is connected with the communication with the pressure sensing port and is operative to provide an output signal representative of the hydrostatic pressure being exerted by the suspension at the pressure sensing port. Suitable means, such as a fritted glass filter, is provided for isolating the solids of the suspension from the pressure sensing means while affording transmission of hydrostatic pressure.

The solids suspended in the liquid medium exert a hydraulic pressure which is proportional to the weight. As the solids settle from the liquid medium, there is a corresponding reduction in the hydrostatic pressure being exerted by the suspension at the pressure sensing port. The pressure sensing means senses this change in hydrostatic pressure and provides an output signal which is indicative of the amount of solids still in suspension and can be utilized to provide a visual readout. The output signal from the pressure sensing means can be connected to a suitable recording device to automatically obtain a continuous graph indicative of the settling rate of the solids versus time. With this arrangement, an automatic record of the entire history of the settling solids from the time of complete dispersion to the time the solids are completely settled can be provided without introducing human error.

In one embodiment, the settling tube is provided with a plurality of vertically spaced pressure sensing ports, each of which is located beneath the liquid level of the suspension and is connected via a separate conduit in liquid communication with a sensing tube located adjacent to the settling tube. The pressure sensing means is connected in liquid communication with the sensing tube and the sensing tube and conduits are filled with a liquid to thereby provide a continuous or solid column of liquid for hydraulically coupling the pressure sensing means with the settling tube. Separate shutoff valve means is provided in each of the conduits for selectively connecting a single pressure sensing port in liquid communication with the pressure sensing means so that the settling rate of the solids at different levels within the suspension can be measured.

BRIEF DESCRIPTION OF THE DRAWINGS

FIG. 1 is a diagrammatic, elevational view of a sedimentation device embodying various of the features of the invention.

FIG. 2 is a side elevational view of an exemplary means for stirring the suspension within the settling tube.

FIG. 3 is a bottom view of the stirring means illustrated in FIG. 2.

DESCRIPTION OF THE PREFERRED EMBODIMENTS

The sedimentation device 10 illustrated in FIG. 1 has an elongated, vertical settling tube 12 for receiving a quantity of a suspension 14 including solid particles, such as magnetite, suspended in a liquid medium, such as water. The sedimentation tube 12 can be constructed from a transparent material, such as glass or an opaque material, such as a metal or a plastic.

Located in the bottom 16 of the sedimentation 12 is a pressure sensing port 18 and located along one side of the sedimentation tube 12 is a plurality of vertically spaced pressure sensing ports 20, 22 and 24, all of which are located below the upper liquid level 26 of the suspension 14. The pressure sensing ports 18, 20, 22 and 24 are in liquid communication with the suspension 14 so that the hydrostatic pressure being exerted by the suspension at their respective locations is transmitted therethrough to a pressure sensing means as explained below.

Located beside the sedimentation tube 12 is an elongated, vertical sensing tube 28 which is preferably constructed from a transparent material, such as glass. The sensing tube 28 is connected in liquid communication with the pressure sensing ports 18, 20, 22 and 24 by respective, generally laterally extending conduits 30, 32, 34 and 36. A suitable filter means, such as a fritted glass filter disc 38, is located in one end of the conduits 30, 32, 34 and 36, adjacent to their respective pressure sensing port, to prevent the solid particles of the suspension 14 from entering the sensing tube 28.

The filter means has a pore size which is small enough to prevent the passage of the smaller particles of the suspension 14 but large enough to afford transmission of the hydrostatic pressure being exerted by the suspension 14 in the vicinity of the corresponding sensing port. Thus, the pore size will vary depending upon the particle size of the solids in the suspension being tested. For example, medium porosity (e.g., 10–14 microns) fritted glass filter discs marketed by the Kimble Glassware Division of Owens-Illinois, Toledo, Ohio, are suitable for use with a variety of magnetite heavy media suspensions. The filter discs 38 preferably are removably mounted so they can be removed for cleaning or replaced with discs having a pore size suitable for the particular suspension being tested.

Disposed in the upper portion of the sensing tube 28 and above the uppermost conduit 36 is a stop cock 40 or similar valve means for selectively closing the sensing tube 28. A stop cock 42 or similar valve is located in each of the conduits 30, 32, 34 and 36 for selectively closing the corresponding conduit. With the stop cock 40 open and all the stop cocks 42 open, the sensing tube 28 and the conduits 30, 32, 34 and 36 are filled with a sensing liquid 44 which is introduced into the sensing tube 38 via a funnel section 46 provided on the upper end of the sensing tube 28. As illustrated, the upper level of the sensing liquid 44 is above the stop cock 40 so that, after the stop cock 40 is closed, a solid or continuous column of the sensing liquid 44 exists in the sensing tube 28 and the conduits 30, 32, 34 and 36 downstream of the filter discs 38.

Connected to the lower portion of the sensing tube 28 and in liquid communication with the sensing liquid 44 is a suitable pressure sensing means, such as a pressure transducer 48, for sensing the hydrostatic pressure of the sensing liquid 44 and providing an output signal representative thereof. When all the stop cocks 42 are open, the pressure transducer 48 is hydraulically coupled or connected to the settling tube 12 via the sensing liquid 44, the filter discs 38 and the pressure sensing ports 18, 20, 22 and 24. The pressure transducer 48 can be selectively hydraulically connected to the settling tube 12 through a single pressure sensing port by closing all stop cocks 42 except the one associated with the desired pressure sensing port. In the embodiment illustrated, the pressure transducer 48 is connected to the settling tube 12 through the conduit 30 and the pressure sensing port 18.

The floating solid particles of the suspension exert a hydraulic pressure which is proportional to their weight. As the solid particles settle, the hydrostatic pressure being exerted by the suspension in the vicinity the pressure sensing ports decreases. This decrease in hydrostatic pressure is a measure in the change of density or specific gravity of the suspension within the settling tube 12 and, thus, the weight of the settled particles. Since the pressure transducer 48 is hydraulically connected to the settling tube 12 through the sensing liquid 44 and a selected pressure sensing port, hydrostatic pressure being exerted by the suspension at that pressure sensing port is transmitted to and sensed by the pressure transducer 48.

The pressure transducer 48 can be any conventional device which is capable of responding to small changes in the hydrostatic pressure resulting from settling of the solid particles and providing an electrical output signal which is representative of the reduced hydrostatic pressure and is usable to provide a visual readout, preferably a permanent recording. For example, a low pressure range strain gage, such as a Model UC2 Zero-length unbonded strain gage (0–1 p.s.i.g.) marketed by Statham Instruments, Inc., Los Angeles, California, can be used.

As illustrated, the pressure transducer 48 is connected to a continuous recorder 50 of a conventional design by electrical leads 52. As the solids of the suspension 14 settle, the output signal from the pressure transducer 48 changes correspondingly and energizes the recorder 50 which provides a continuous graph 54 indicative of the settling rate of the solid particles. Preferably, the recorder 50 is a X–Y type plotter and is calibrated to record the weight of the fluid-born solid particles in the suspension versus time.

For operation of the device, a quantity of the suspension to be measured is introduced into the settling tube 12. With the sensing tube stop cock 40 and all the stop cocks 42 open, the sensing tube 28 and the conduits 30, 32, 34 and 36 are filled with a liquid to a level above the stop cock 40. The stop cock 40 is closed to provide a solid or continuous column of the sensing liquid between the filter discs 38 and the sensing chamber of the pressure transducer 48. While the sensing liquid is preferably the same as the carrier liquid for the suspension 14, a wide variety of substantially incompressible liquids which are suitable for hydraulically connecting the pressure transducer 48 with the settling tube 12 can be used as the sensing liquid 44.

After the settling tube 12 and the sensing tube 28 have been filled, the stop cocks 42 are closed and the suspension 14 is vigorously stirred to disperse the solid particles throughout the carrier liquid. FIGS. 2 and 3 illustrate an exemplary stirring device 60 which can be used for this purpose. The stirring device 60 includes an elongated rod 62 and a disc 64 having perforations 66 mounted on the lower end of the rod 62. The stirring device 60 is inserted into the settling tube 12 and is moved up and down in the suspension 14. The filter disc 38 serves to prevent solid particles of the suspension 14 from entering the sensing tube 28, during stirring or settling, and thereby causing an erroneous hydrostatic pressure measurement.

In the illustrated embodiment, the conduits 30, 32, 34 and 36 are generally horizontal. If desired, the conduits can be arranged to slope downwardly towards the settling tube 12 so that any particles which happen to pass through the filter discs 38 tend to settle and collect in the conduits rather than flowing into the sensing tube and/or the sensing chamber of the pressure transducer 48.

After completion of stirring, the stirring device 60 is preferably removed from the settling tube 12. The stirring device 60 does not interfere with settling or contribute to the hydrostatic pressure of the settling solid particles, so it can be left in the settling tube 12 while measurements are being made, if desired.

One of the stop cocks 42 is opened, i.e., the one corresponding to the desired level in the suspension 14 at which the settling rate of the solids is to be measured, and the recorder 50 is started. During sedimentation of the solids, the recorder 50 provides a continuous graph 54 indicating the weight of solids suspended in the carrier liquid versus time. Thus, the slope of the graph 54 is indicative of the settling rate of the solids, i.e., the reduction in weight of the suspended solids over a time period represents the weight of solids which have settled during this time period. The recorder 50 can be calibrated so that the graph reads zero when all of the solids have settled, i.e., the pressure being sensed by the pressure transducer 48 and recorded by the recorder 50 is the hydrostatic pressure being exerted by the carrier liquid.

In the embodiment illustrated, the entire history of the settling for all the suspended solids will be provided. When the solid particles have completely settled, the measurement recorded by the recorder 50 is at a constant value and is entirely due to the carrier liquid. The settled particle solids 56 sitting on the bottom 16 of the settling tube 12 are isolated from the pressure transducer 48 by the filter disc 38 and do not contribute to the hydrostatic pressure being sensed by the pressure transducer 48. If the settling rate of the solids of a different level within the suspension 14 is desired, all the top cocks 42 are closed, the suspension 14 is again vigorously stirred as described above, and the stop cock 42 corresponding to the pressure sensing port located at the desired level is opened. In this case, the recorder 50 provides a continuous graph of the settling rate for the solid particles until all the settling particles have moved past the vertical level of the selected pressure sensing port. After that time, the solid particles, even through not completely settled onto the bottom of the settling tube 12, do not contribute to the hydrostatic pressure being exerted by the suspension at the selected pressure sensing port. When a measurement of another level is desired, this procedure is repeated.

This capability being able to accurately and quickly measure the settling rate of the solids at different vertical levels or elevations within the suspension generally is not available with prior art devices. As mentioned above, this information can be very useful for processes in which a overflowing supernatant is employed or portions of the supernatant are withdrawn at different elevations within the suspension.

Although an embodiment of this device employing a sensing tube 28 has been illustrated and described in detail, it should be understood that the pressure transducer 48 can be connected in direct liquid communication with a pressure sensing port. For instance, when it is desired to measure only the settling rate for the entire suspension 14 within the settling tube 12, the pressure transducer 48 can be connected in direct liquid communication with pressure sensing port 18. A filter disc 38 or similar filtering means is used to prevent the settling solids from entering the sensing chamber of the pressure transducer. The pressure transducer can be coupled close enough to the sensing port so that a small quantity of the carrier liquid passing through the filter disc 38 hydraulically couples or connects the pressure transducer with the settling tube 12.

A suitable draining means, such as plug 58, can be provided in the bottom of the settling tube 12 for draining and cleaning the settling tube 12 after measurements have been completed. Also, a suitable drain valve (not shown) can be provided at the lowermost point of the sensing tube 28 for draining the sensing liquid 44.

It will be appreciated by those skilled in the art, a sedimentation device arranged in accordance with the invention can be used to measure the settling rate of the wide variety of solid particles dispersed or suspended in many different liquid media. Since a continuous record of the settling rate can be provided automatically, measurements can be taken over long durations, such as on suspensions containing solids which settle at an extremely slow rate, and human error is eliminated. Thus, the device has many applications, especially in the chemical, sanitation and metallurgical engineering fields.

Although the preferred embodiments of the invention have been illustrated and described in detail, it will be apparent to those skilled in the art that various changes and modifications can be made thereto without departing from the spirit and scope of the invention.

I claim:

1. A device for measuring the settling rate of solid particles suspended in a liquid medium comprising
    a settling tube for receiving a quantity of the suspension to be measured;
    a pressure sensing port located in said settling tube for liquid communication with the suspension;
    a pressure sensing means located in a liquid communication with said pressure sensing port for sensing the hydrostatic pressure being exerted by the suspension at said sensing port and providing an output signal representative of said hydrostatic pressure;
    means responsive to said output signal for providing an indication indicative of the weight of the solid particles remaining suspended in the liquid medium during settling of the solid particles from the liquid medium; and means for isolating the solid particles of the suspension from said pressure sensing means and yet permitting the transmission of said hydrostatic pressure to said pressure sensing means.

2. A device according to claim 1 wherein said indication means comprises recording means operatively connected to said pressure sensing means and responsive to said output signal for automatically providing a continuous recording indicative of the weight of the solid particles remaining suspended in the liquid medium as a function of time during settling.

3. A device according to claim 1 wherein said pressure measuring means comprises a strain gauge pressure transducer.

4. A device according to claim 1 wherein said isolation means is a fritted glass filter which is located between said pressure sensing port and said pressure sensing means and has a pore size small enough to prevent substantial passage of the solid particles therethrough.

5. A device according to claim 1 including
a sensing tube located adjacent to said settling tube for receiving a sensing liquid, said pressure sensing means being connected in liquid communication with said sensing tube; and
means for connecting said sensing tube in liquid communication with said pressure sensing port so that the sensing liquid contained in said sensing tube hydraulically connects said pressure sensing means with said settling tube through said pressure sensing port.

6. A device according to claim 5 including
a plurality of said pressure sensing ports located in vertically spaced relation along said settling tube;
separate conduit means connecting each of said pressure sensing ports in liquid communication with said sensing tube; and
means located in each of said conduit means for selectively interrupting liquid communication between said sensing tube and the respective of said pressure sensing ports whereby, after said sensing tube and said conduit means have been filled with the sensing liquid, said hydrostatic pressure being exerted by the suspension at any preselected one of said pressure sensing ports is transmitted through the sensing liquid to said pressure sensing means.

7. A device according to claim 1 wherein said pressure sensing port is located in the bottom of said settling tube.

8. A device according to claim 6 wherein one of said pressure sensing ports is located in the bottom of said settling tube.

9. A device for measuring the settling rate of solid particles suspended in a liquid medium comprising
a vertical settling tube for receiving a quantity of the suspension to be measured;
a pressure sensing port located in the bottom of said settling tube;
a pressure transducer located in liquid communication with said pressure sensing port for sensing the hydrostatic pressure exerted by the suspension at said pressure sensing port and providing an electrical output signal representative of said hydrostatic pressure;
recording means operatively connected to said pressure transducer and responsive to said output signal for providing a continuous recording indicative of the weight of the solid particles remaining suspended in the liquid medium as a function of time during settling of the solid particles from the liquid medium; and
means for isolating the solid particles of the suspension from said pressure transducer and yet permitting the transmission of said hydrostatic pressure to said pressure transducer.

10. A device according to claim 9 including
a sensing tube for receiving a sensing liquid connected in liquid communication with said pressure transducer;
a plurality of additional pressure sensing ports located in vertically spaced relation along said settling tube;
separate conduit means for connecting each of said pressure sensing ports in liquid communication with said sensing tube so the sensing liquid contained in said sensing tube and said conduit means hydraulically connects said pressure transducer with the settling tube through said pressure sensing ports; and
valve means located in each of said conduit means for selectively interrupting liquid communication between said sensing tube and respective of said pressure sensing ports whereby, after said sensing tube and said conduit means have been filled with the sensing liquid, the hydrostatic pressure exerted by the suspension at any preselected one of said pressure sensing ports is transmitted through the sensing liquid to said pressure transducer.

* * * * *